(12) United States Patent
Ait-Ameur et al.

(10) Patent No.: US 8,392,581 B2
(45) Date of Patent: Mar. 5, 2013

(54) INTELLIGENT IMS SIP SESSION SETUP OPTIMIZATION

(75) Inventors: Samir Ait-Ameur, Fremont, CA (US); Emerando M Delos Reyes, Pleasant Hill, CA (US); Imtiyaz Shaikh, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 240 days.

(21) Appl. No.: 12/480,942

(22) Filed: Jun. 9, 2009

(65) Prior Publication Data

US 2010/0312896 A1 Dec. 9, 2010

(51) Int. Cl.
*G06F 15/173* (2006.01)
*G06F 15/16* (2006.01)
*G06F 11/00* (2006.01)
*G06F 7/04* (2006.01)
*H04L 12/16* (2006.01)
*H04L 12/66* (2006.01)
*H04L 12/56* (2006.01)
*H04L 12/28* (2006.01)
*H04W 4/00* (2009.01)
*H04W 24/00* (2009.01)
*H04B 7/00* (2006.01)

(52) U.S. Cl. ........ 709/227; 709/223; 709/225; 709/228; 709/229; 370/225; 370/260; 370/270; 370/331; 370/352; 370/355; 370/389; 370/392; 370/401; 370/412; 455/435.1; 455/456.1; 455/466; 455/521; 726/4

(58) Field of Classification Search .................. None
See application file for complete search history.

(56) References Cited

U.S. PATENT DOCUMENTS

| | | | | |
|---|---|---|---|---|
| 7,089,027 B1 * | 8/2006 | Welch et al. | ................... | 455/521 |
| 7,355,968 B2 * | 4/2008 | Liu et al. | ........................ | 370/225 |
| 7,453,831 B2 * | 11/2008 | Dorenbosch et al. | ......... | 370/270 |
| 2002/0065073 A1 * | 5/2002 | Natani et al. | ................... | 455/422 |
| 2004/0008688 A1 * | 1/2004 | Matsubara et al. | ...... | 370/395.21 |
| 2004/0133683 A1 * | 7/2004 | Keller et al. | ................... | 709/227 |
| 2005/0201357 A1 * | 9/2005 | Poyhonen | ..................... | 370/352 |
| 2006/0067507 A1 * | 3/2006 | Erhart et al. | ................ | 379/265.12 |
| 2007/0036093 A1 * | 2/2007 | Newberg et al. | .............. | 370/260 |
| 2007/0124438 A1 * | 5/2007 | Park et al. | ..................... | 709/223 |
| 2007/0162599 A1 * | 7/2007 | Nguyen | ........................ | 709/225 |
| 2007/0206620 A1 * | 9/2007 | Cortes et al. | .................. | 370/412 |
| 2007/0253435 A1 * | 11/2007 | Keller et al. | ................... | 370/401 |
| 2007/0259661 A1 | 11/2007 | Hurtta et al. | | |
| 2008/0120702 A1 * | 5/2008 | Hokimoto | ........................ | 726/4 |
| 2008/0133665 A1 * | 6/2008 | Lybeck et al. | ................ | 709/204 |
| 2008/0144615 A1 * | 6/2008 | Casey | ........................... | 370/389 |
| 2008/0155659 A1 * | 6/2008 | Gazier et al. | ...................... | 726/4 |
| 2008/0165762 A1 * | 7/2008 | Gilfix et al. | .................... | 370/352 |
| 2008/0186921 A1 * | 8/2008 | Long et al. | .................... | 370/331 |

(Continued)

*Primary Examiner* — Ario Etienne
*Assistant Examiner* — Ho Shiu

(57) ABSTRACT

Systems and/or methods described herein may include an Internet Protocol (IP) Multimedia Subsystem (IMS) Session Initiation Protocol (SIP) optimization server in communication with network elements within an IMS network. The IMS SIP optimization server may facilitate an end-to-end SIP session between an originating user device and a terminating user device, while sending SIP session information to intermediate network elements in parallel. The IMS SIP optimization server may receive a SIP request from a first network element and send a related SIP request to a last network element. The IMS SIP optimization server may also send customized packet messages to any intermediate network elements, where the intermediate network elements are between the first network element and the last network element in the SIP sequence, and where the customized packet message includes SIP setup commands for each of the intermediate network elements.

22 Claims, 7 Drawing Sheets

U.S. PATENT DOCUMENTS

| | | | |
|---|---|---|---|
| 2008/0274739 A1* | 11/2008 | Wu | 455/435.1 |
| 2008/0275883 A1 | 11/2008 | Ashraf et al. | |
| 2008/0298351 A1* | 12/2008 | Buckley et al. | 370/355 |
| 2009/0193131 A1* | 7/2009 | Shi | 709/229 |
| 2009/0213838 A1* | 8/2009 | Van Elburg et al. | 370/352 |
| 2009/0221310 A1* | 9/2009 | Chen et al. | 455/466 |
| 2009/0238174 A1* | 9/2009 | Veenstra et al. | 370/352 |
| 2010/0130227 A1* | 5/2010 | Farthofer et al. | 455/456.1 |
| 2010/0136970 A1* | 6/2010 | Mui et al. | 455/435.1 |
| 2010/0153563 A1* | 6/2010 | Ku | 709/228 |
| 2010/0238928 A1* | 9/2010 | Prouvost et al. | 370/392 |
| 2010/0254370 A1* | 10/2010 | Jana et al. | 370/352 |
| 2010/0266110 A1* | 10/2010 | Soo et al. | 379/93.01 |
| 2011/0060771 A1* | 3/2011 | Llorente et al. | 707/812 |

* cited by examiner

INTELLIGENT IMS SIP SESSION SETUP OPTIMIZATION

BACKGROUND

The Internet Protocol (IP) multimedia subsystem (IMS), defined by the 3$^{rd}$ Generation Partnership Project (3GPP), is an architectural framework for implementing IP-based telephony and multimedia services. IMS defines a set of specifications that enables the convergence of voice, video, data and mobile technology over an all IP-based network infrastructure. In particular, IMS fills the gap between two of the most successful communication paradigms, cellular and Internet technology, by providing Internet services everywhere using cellular technology in a more efficient way. Session Initiation Protocol (SIP) is the main protocol for IMS. IMS aims to ensure that IMS applications work consistently across different network infrastructures.

Current IMS SIP call flow systems provide serial and lengthy steps to setup or tear down a SIP session between caller A and caller B. These IMS SIP sessions can originate from an IMS-capable device and terminate at another IMS-capable device, a public switched telephone network (PSTN) or a non-IMS wireless device. SIP setup and/or tear-down processes typically flow serially, with IMS network elements sending each other similar and redundant SIP message commands. These similar and redundant SIP message commands increase the number of SIP message steps to execute and, in turn, increase the time to setup and teardown a SIP session.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Systems and/or methods described herein may optimize message traffic and reduce delays for SIP session setups and teardowns without requiring the SIP session call flow to involve every single network element in the process required to establish a SIP connection. An IMS SIP optimization server may identify and store customized SIP session messages for each network element within an IMS network. The IMS SIP optimization server may also collect historic SIP session data and identify patterns to predict SIP session activity. As described further herein, this previously stored information may be used to enable parallel signaling for end devices and intermediate network elements during a single SIP setup and/or teardown session.

Figure 1:
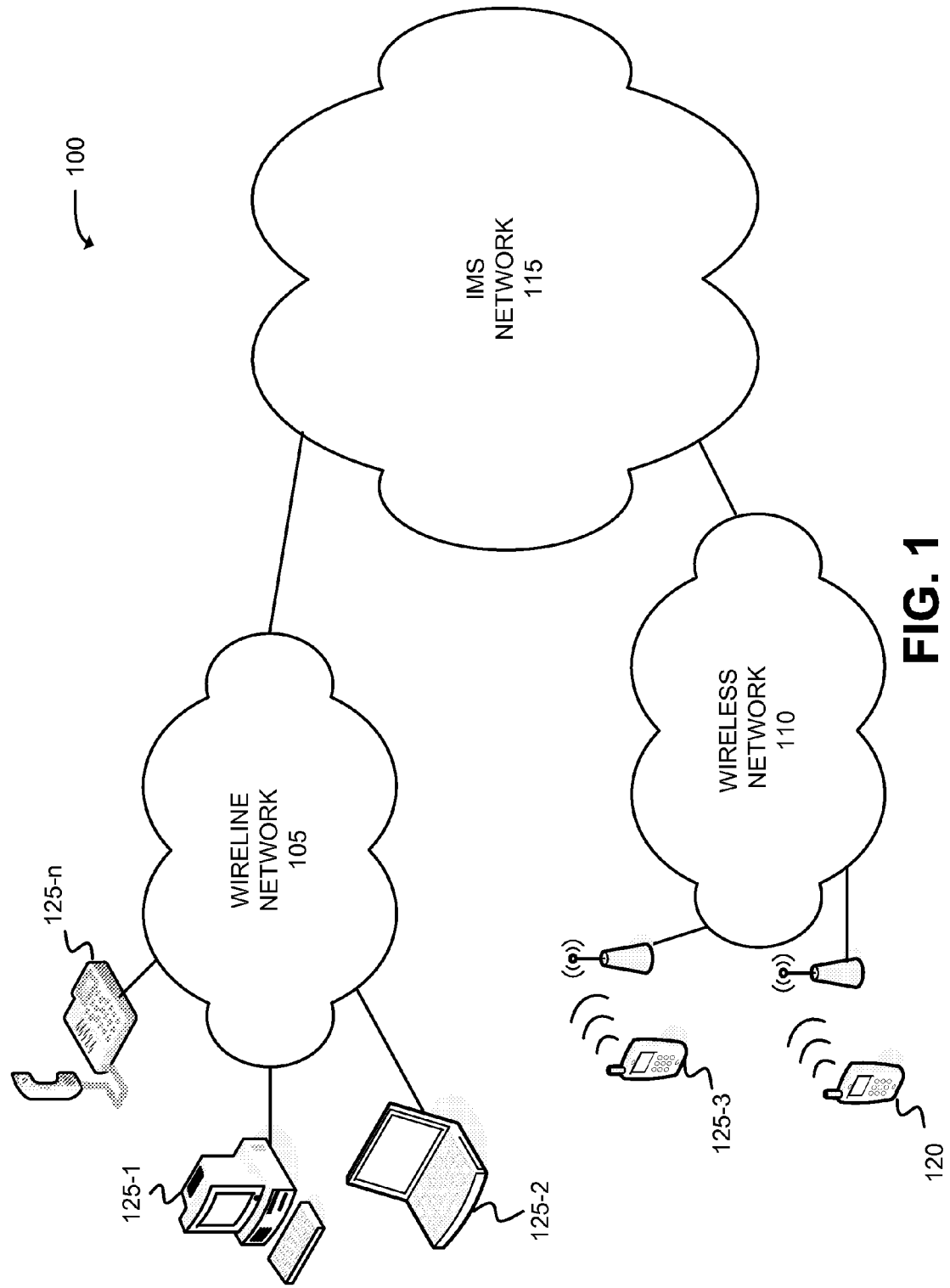
FIG. 1 is a diagram of an exemplary network in which systems and methods described herein may be implemented.

FIG. 1 provides a diagram of an exemplary network 100 in which systems and/or methods described herein may be implemented. More particularly, network 100 may implement intelligent IMS SIP session setup optimization. As shown in FIG. 1, network 100 may include a wireline access network 105 and a wireless network 110, both connected to an IMS network 115. Originating user device 120 and terminating user devices 125-1 through 125-n (referred to generally as "terminating user devices 125") may be connected to wireline access network 105 and/or wireless network 110 to facilitate communications between originating user device 120 and one or more terminating user devices 125. For simplicity, one wireline access network 105, one wireless network 110, and one IMS network 115, and several user devices 120/125 have been illustrated in FIG. 1. In practice, there may be more wireline access networks, wireless networks, and IMS networks, and user devices.

Wireline network 105 may include one or more wireline-based networks, such as, for example, a local area network (LAN); a wide area network (WAN); a metropolitan area network (MAN); a telephone network, such as the public switched telephone network (PSTN); an intranet; and/or the Internet.

Wireless network 110 may include one or more wireless-based networks, such as, for example, a wireless satellite network and/or a wireless public land mobile network (PLMN). Wireless network 110 may include a variety of access technologies available to originating user device 120 and/or terminating user device 125. For example, wireless network 110 may include wireless Global System for Mobile Communications (GSM) networks and/or Code Division Multiple Access (CDMA) networks, or any 3$^{rd}$ Generation Partnership Project (3GPP)—compliant cellular network (e.g., 3GPP or 3GPP2).

IMS network 115 may include a network that may interact with networks 105 and 110 to implement IP-based telephony and multimedia services. IMS network 115 may generally be operable according to the standards defined by the 3GPP and to allow service providers manage a variety of services that can be delivered via IP over any network type, where IP is used to transport both bearer traffic and Session Initiation Protocol (SIP)-based signaling traffic. IMS network 115 may include multiple layers (e.g., a services/application layer, an IMS layer, and a transport layer) that include a variety of network elements to delivers applications and/or services for use by user devices 120/125. Exemplary services include caller ID related services, call waiting, call holding, push-to-talk, conference call servers, voicemail, instant messaging, call blocking, and call forwarding. Further details of IMS network 115 are described below with respect to FIG. 2.

Generally, originating user device 120 and terminating user devices 125-1 through 125-n may use services provided by IMS network 115. Originating user device 120 may include a wireless communications device that accesses IMS network 115 via wireless network 110. For example, originating user device 120 may include a personal computer (e.g., a laptop, a palmtop, or handheld computing device) equipped with a suitable wireless modem; a mobile communications device (e.g., cellular radiotelephones or data-enabled handheld devices capable of receiving and sending messages, web browsing, etc.); a portable gaming system; or any enhanced PDA device or integrated information appliance capable of email, video mail, Internet access, messaging, scheduling, information management, and the like.

Terminating user devices 125-1 through 125-*n* may include a wired or wireless communications device. Thus, in one implementation, terminating user device 125 may be configured similarly to originating user device 120 described above. In other implementations, terminating user devices 125 may include another device configured to receive information over wireline network 110, such a PSTN.

Figure 2:
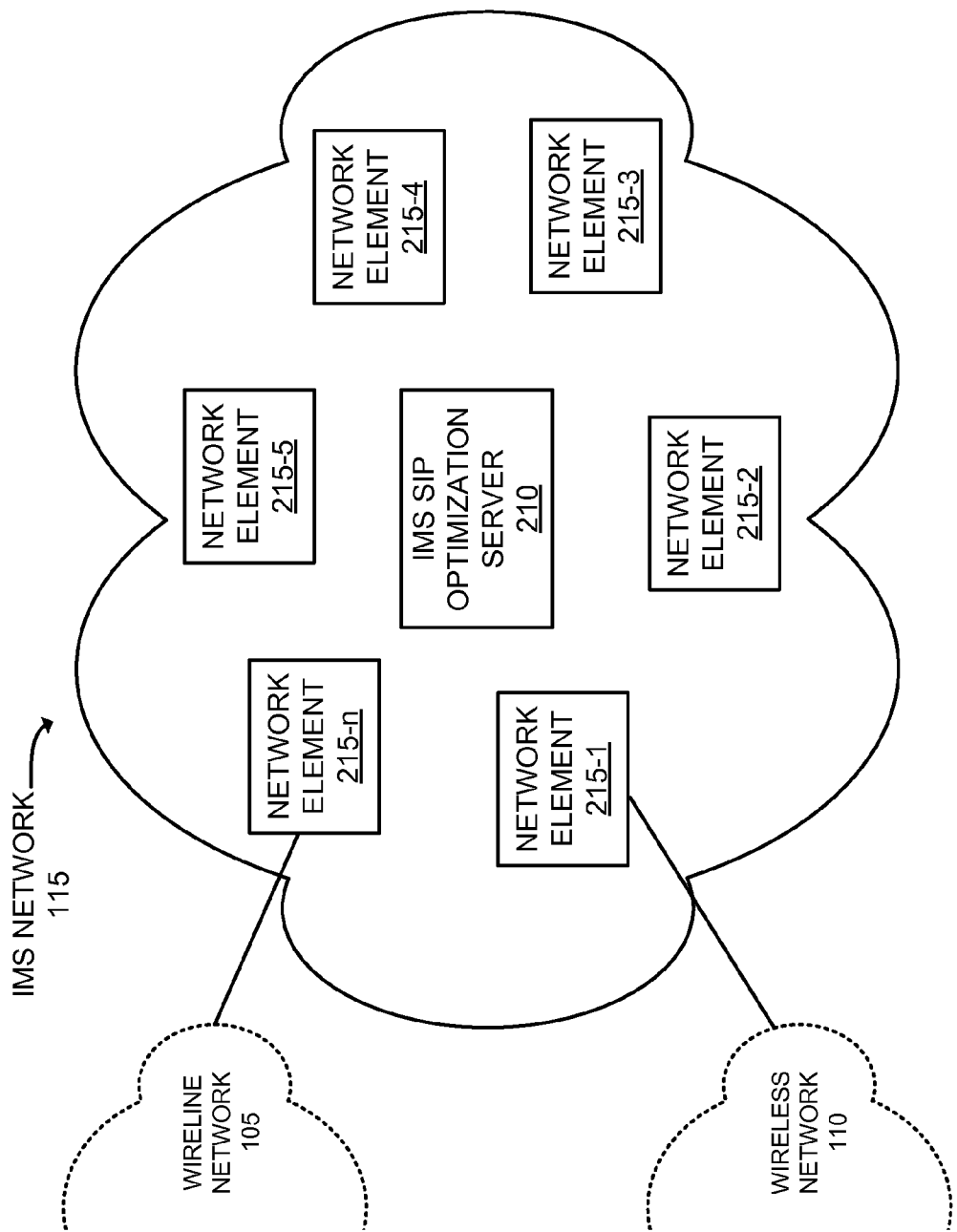
FIG. 2 is a diagram that depicts further details of the exemplary IMS network of FIG. 1.

FIG. 2 depicts further details of IMS network 115. As shown, IMS network 115 may include an IMS SIP optimization server 210 and a number of network elements 215-1 through 215-*n* (collectively, "network elements 215" and generically, "network element 215").

IMS SIP optimization server 210 may include one or more servers, or other types of computation or communication devices, that gather, process, search, and/or provide information in a manner described herein. In one implementation, IMS SIP optimization server 210 may include a server (e.g., a computer system) with multiple modules to optimize setup and teardown of SIP sessions. As described further herein, IMS SIP optimization server 210 may use previous SIP session data to quickly establish a SIP session between an originating user device (e.g., originating user device 120) and an end using device (terminating user device 125) and facilitate parallel transactions with multiple network elements 215 to meet SIP call flow standards. IMS SIP optimization server 210 is described in more detail with respect to FIGS. 3 and 4.

Network elements 215 may include one or more IMS servers, such as proxy call/session control function (P-CSCF) servers, serving CSCF (S-CSCF) servers, interrogating CSCF (I-CSCF) servers, SIP application servers (SIP AS), and/or home subscriber servers (HSS). For example, network element 215-1 may be a P-CSCF server that serves as a first point of contact between an originating user device (e.g., originating user device 120) and IMS network 115. The P-CSCF server 215-1 may serve as an outbound/inbound SIP proxy server, where requests initiated by originating user device 120 may traverse to P-CSCF server 215-1. As the first point of contact within IMS network 115, P-CSCF server 215-1 (or any other network element 215 acting as the first point of contact) may provide requests initiated by originating user device 120 to IMS SIP optimization server 210.

The other network elements 215 may further facilitate session setup and provision of multimedia services to originating user device 120. For example, another network element (e.g., network element 215-2) may be a S-CSCF server. The S-CSCF server may include a SIP server that serves as a central node in the SIP signaling plane. The S-CSCF server may perform session control. Another network element (e.g., network element 215-*n*) may be an I-CSCF server. The I-CSCF server may include a SIP server that may be located at an edge of an administrative domain. The I-CSCF server may publish its IP address in the Domain Name System (DNS) record of the domain in which the I-CSCF resides so that remote servers can find the I-CSCF and use the I-CSCF as a forwarding point for SIP packets in the domain. In addition to SIP proxy functionality, the I-CSCF may include an interface to the HSS (another of network elements 215) to retrieve user information and to route messages to an appropriate destination (e.g., S-CSCF). Another network element (e.g., network element 215-3) may be a SIP AS. The SIP AS may include a SIP entity that hosts and executes services, and interfaces with the S-CSCF. The HSS may include a master user database that supports IMS network 115 and contains subscription-related information. The HSS may perform authentication and authorization of users and can provide information about a subscriber's location and IP information.

In one example, certain network elements 215 may be owned and/or managed by a particular carrier that is different than the carrier that owns and/or manages other certain network elements 215. Network elements 215 may further include one or more gateways. For example, network elements 215 may include gateways to interface IMS network 115 with parts of wireline network 105, such as a PSTN.

Figure 3:
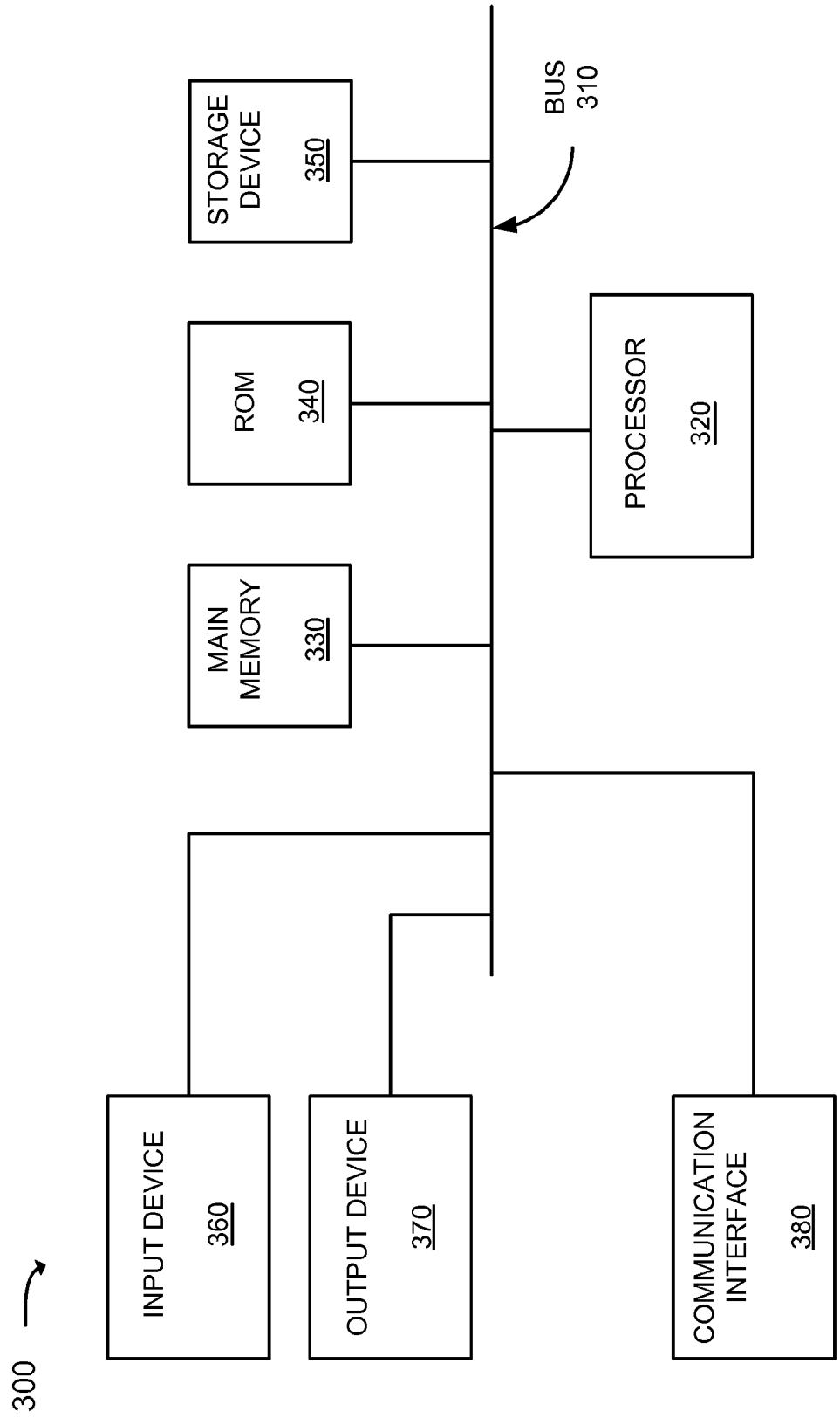
FIG. 3 illustrates exemplary components of the IMS SIP optimization server and/or the network elements of the network depicted in FIG. 2.

FIG. 3 is an exemplary diagram of a device 300 that may correspond to IMS SIP optimization server 210 and/or network elements 215. As illustrated, device 300 may include a bus 310, a processor 320, a main memory 330, a read-only memory (ROM) 340, a storage device 350, an input device 360, an output device 370, and/or a communication interface 380. Bus 310 may include a path that permits communication among the components of device 300.

Processor 320 may include one or more processors, microprocessors, or other types of processing devices that may interpret and execute instructions. Main memory 330 may include one or more random access memories (RAMs) or another type of dynamic storage device that may store information and instructions for execution by processor 320. ROM 340 may include one or more ROM devices or another type of static storage device that may store static information and/or instructions for use by processor 320. Storage device 350 may include one or more magnetic and/or optical recording media and their corresponding drives.

Input device 360 may include one or more mechanisms that permit an operator to input information to device 300, such as a keyboard, a mouse, a pen, a microphone, voice recognition and/or biometric mechanisms, etc. Output device 370 may include one or more mechanisms that output information to the operator, including a display, a printer, a speaker, etc. Communication interface 380 may include any transceiver-like mechanisms that enable device 300 to communicate with other devices and/or systems. For example, communication interface 380 may include mechanisms for communicating with another device or system via a network, such as network 150.

As described herein, device 300 may perform certain operations in response to processor 320 executing software instructions contained in a computer-readable medium, such as main memory 330. A computer-readable medium may be defined as a physical or logical memory device. A logical memory device may include memory space within a single physical memory device or spread across multiple physical memory devices. The software instructions may be read into main memory 330 from another computer-readable medium, such as storage device 350, or from another device via communication interface 380. The software instructions contained in main memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, differently arranged, or additional components than depicted in FIG. 3. In still other implementations, one or more components of device 300 may perform one or more other tasks described as being performed by one or more other components of device 300.

Figure 4:
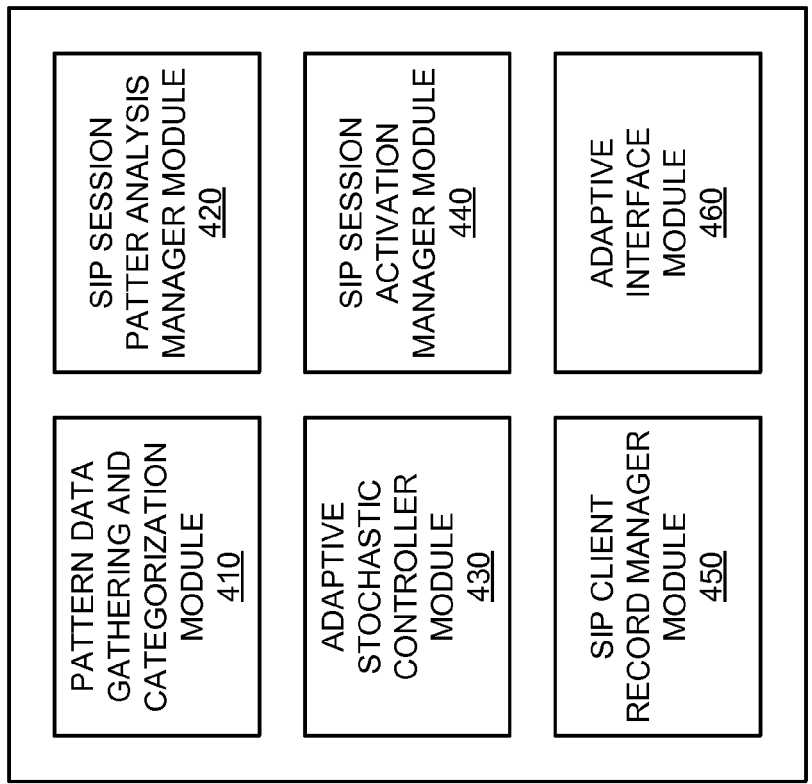
FIG. 4 depicts a diagram of exemplary functional components of the IMS SIP optimization server of FIG. 2.

FIG. 4 depicts a diagram of exemplary functional components of IMS SIP optimization server 210. As shown in FIG. 4, IMS SIP optimization server 210 may include a pattern data gathering and categorization module (PDGCM) 410, a SIP sessions pattern analysis manager module (SSPAMM) 420, an adaptive stochastic controller module (ASCM) 430, a SIP sessions activation manager module (SSAMM) 440, a client record network module (CRNM) 450, and an adaptive interface module 460.

PDGCM 410 may collect SIP session data for callers of the originating device (e.g., originating user device 120) and organize the data into main categories. Session data may include, for example, a source address, a destination address (e.g., of a terminating user device 125), time of calls (e.g., time stamps), duration of calls, etc. Additionally, information about the access network of the originating user device and any visited (e.g., roamed) network may be collected. PDGCM 410 may further collect IMS SIP extension information for how to negotiate quality of service (QoS), security, and other call behavior for each SIP session between the originating device (originating user device 120) and an endpoint (e.g., terminating user devices 125).

Main categories used by PDGCM 410 for SIP session data may include, for example, distinguishing between calls to wireline networks and calls to wireless networks. For example, for each originating device, PDGCM 410 may differentiate between SIP sessions with terminating user devices 125 that use a wireline network (e.g., terminating user device wireline network 105) and SIP sessions that use a wireless network (e.g., wireless network 115). In one implementation, PDGCM 410 may be implemented within processor 320 of IMS SIP optimization server 210. Data collected by PDGCM 410 may be stored, for example, in main memory 330 and/or storage device 350 of IMS SIP optimization server 210.

SSPAMM 420 may determine call patterns and identify sub-categories of data from PDGCM 410. For example, SSPAMM 420 may analyze the source and destination address, the frequency of calls to destinations, the duration of the calls, and other relevant data associated with each call to construct and manage sub-categories. In one implementation, SSAMM 420 may further categorize wireless network SIP session data for the caller into sub-categories based on the type of wireless protocol (e.g., CDMA, GSM, 3G LTE, etc.) used for the session.

SSPAMM 420 may rearrange the priorities and the queuing system used to manage the sub-categories. For example, call patterns may be used to allocate resources to facilitate a predicted SIP session. In one implementation, SSPAMM 420 may be implemented within processor 320 of IMS SIP optimization server 210. Pattern data for SSPAMM 420 may be stored separately from PDGCM 410 data in, for example, main memory 330 and/or storage device 350 of IMS SIP optimization server 210.

ASCM 430 may apply control theory methods to gauge the accuracy of the patterns in SSPAMM 420. For example, ASCM 430 may apply one or more stochastic control methodologies based on the nature and changes of the data set of the managed subcategories (e.g., obtained from SSPAMM 420). In one implementation, ASCM 430 may compute three parameters to gauge the quality of the pattern and the accuracy ratio. ASCM 430 may then coordinate these results with the proper destinations of SIP sessions and the time stamps. Furthermore, ASCM 430 may feed this data into SSAMM 440 and keep track as to which stochastic methodology is most optimal to yield the most accurate SIP session setup. In one implementation, ASCM 430 may be implemented within processor 320 of IMS SIP optimization server 210.

SSAMM 440 may use input from ASCM 430 to initiate SIP sessions between two or more devices (e.g., an originating device and one or more terminating devices). For example, based on the data and pattern analysis from ASCM 430, SSAMM 440 may initiate a SIP session between two devices (e.g., originating user device 120 and one of terminating devices 125) without the need for the two devices to wait for all the intermediate network elements 215 involved in the SIP session to process their relevant SIP message(s) or step(s). While setting up the SIP session, SSAMM 440 may, in parallel, feed appropriate SIP messages and other relevant data to the other network elements 215 that would be involved in the regular setup of a SIP session. The appropriate SIP messages for each network element may be, for example, determined in advance based on information collected by adaptive interface module 460 described below. In one implementation, SSAMM 440 may be implemented within processor 320 of IMS SIP optimization server 210.

CRNM 450 may keep track of types of SIP messages for each originating user device 120 and corresponding network elements with the ratio and counts of successes and failures of call setups and teardowns. CRNM 450 may feed this information back into SSPAMM 420 to improve the pattern recognition and sub-categorization methodology. For example, CRNM 450 may identify a success ratio for a particular originating device 120 that may be used to improve call pattern recognition for the originating device 120. Similarly, CRNM 450 may identify a success ratio for a particular network element 215 that may be used to improve SIP setup sessions that include that particular network element 215. In one implementation, CRNM 450 may be implemented within processor 320 of IMS SIP optimization server 210.

Adaptive interface module 460 may provide customized packet messages to appropriate network elements 215 within the existing IMS architecture (e.g., IMS network 115) to which the IMS SIP optimization server 210 is connected. The customized packet messages may include SIP commands to other network elements involved in projected SIP sessions. Adaptive interface module 460 may further process reply messages to the customized packet message and return the results status from the corresponding network element. Thus, adaptive interface module 460 may build and update a library of SIP commands and messages for corresponding network elements 215. In one implementation, adaptive interface module 460 may be implemented within processor 320 of IMS SIP optimization server 210. SIP commands and messages for adaptive interface module 460 may be stored in, for example, main memory 330 and/or storage device 350 of IMS SIP optimization server 210.

Although FIG. 4 shows exemplary functional components of IMS SIP optimization server 210, in other implementations, IMS SIP optimization server 210 may contain fewer, different, differently arranged, or additional functional components than depicted in FIG. 4. In still other implementations, one or more functional components of IMS SIP optimization server 210 may perform one or more other tasks described as being performed by one or more other functional components of IMS SIP optimization server 210.

Figure 5:
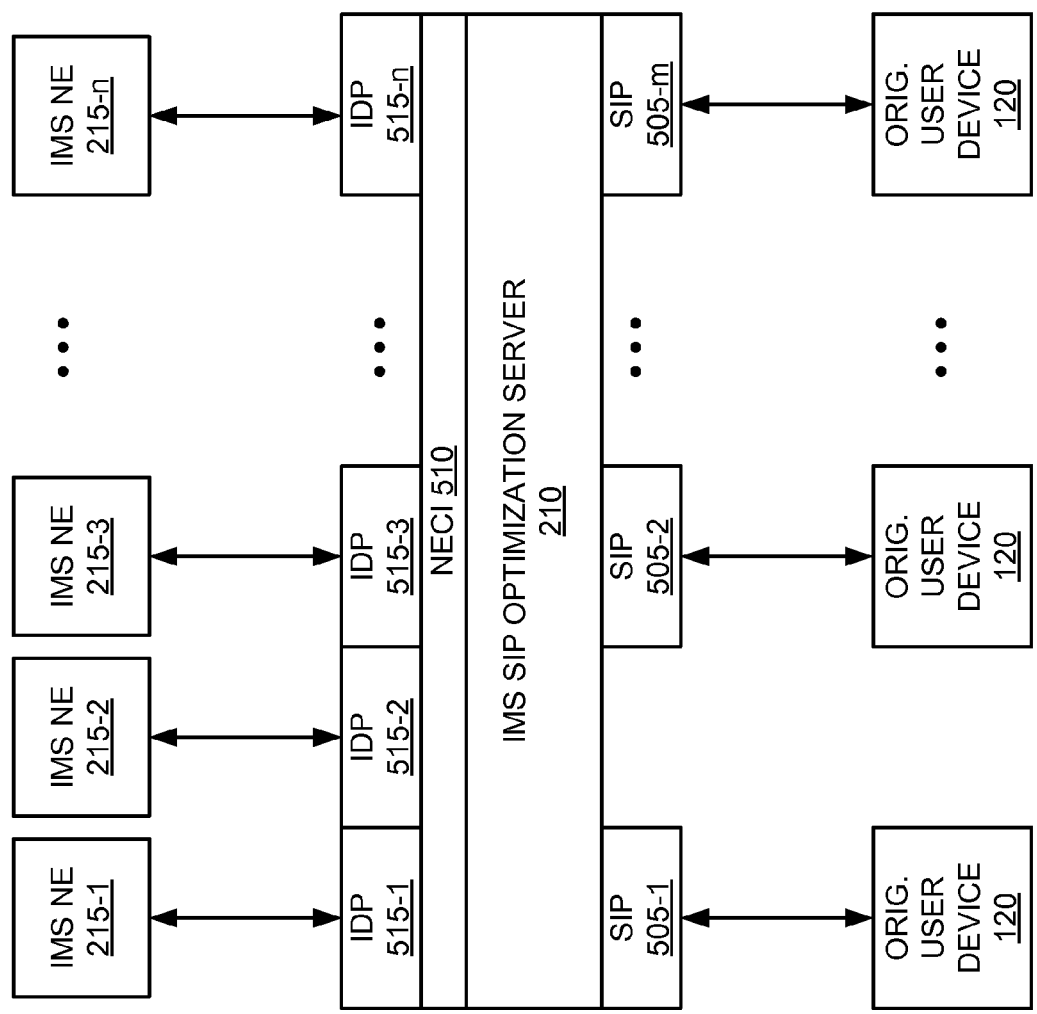
FIG. 5 depicts a diagram of exemplary interactions among components of an exemplary portion of the network illustrated in FIGS. 1 and 2.

FIG. 5 depicts a diagram of exemplary interactions among components of a portion of the network illustrated in FIGS. 1 and 2. As shown in FIG. 5, SIP session requests 505-1, 505-2, . . . , **505-*m* from one or more originating user devices 120 may be directed (e.g., via a first network element (not shown)) to IMS SIP optimization server 210. IMS SIP optimization server 210 may include a network element connection interface (NECI) 510 to facilitate the exchange of customized packet messages to network elements 215. Particularly, a customized packet message, referred to herein as an interface data packet (IDPs) 515-1, 515-2, 515-3, . . . , 515-*n*, may be provided to each respective network element 215-1, 215-2, 215-3, . . . , 215-*n***. Because each network element 215 has its own set of commands and/or steps to set up a SIP session, IMS SIP optimization server 210 (e.g., adaptive interface module 460) may provide a unique IDP 515 for each network element required for an IMS SIP session requested by one of originating devices 120. IMS SIP optimization server 210 may be implemented as a single server device or IMS SIP optimization server 210 may be a distributed system.

Figure 6:
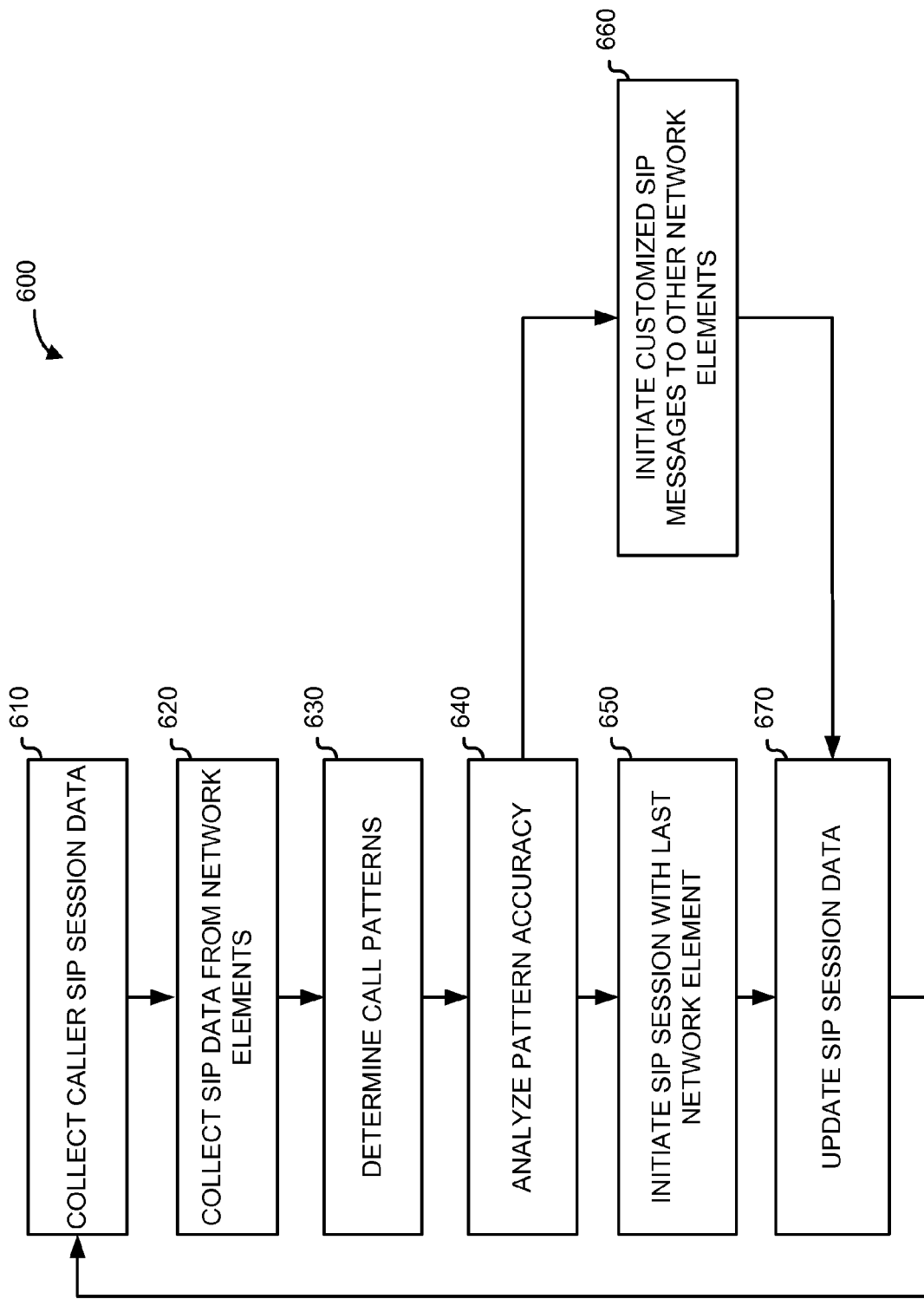
FIG. 6 is a flow diagram illustrating an exemplary process for establishing an IMS SIP session.

FIG. 6 depicts a flow diagram illustrating an exemplary process 600 for establishing an IMS SIP session according to implementations described herein. In one implementation, process 600 may be performed by IMS SIP optimization server 210. In another implementation, some or all of process 600 may be performed by another device or group of devices, including or excluding IMS SIP optimization server 210.

As illustrated in FIG. 6, process 600 may begin with collecting caller SIP session data (block 610). For example, IMS SIP optimization server 210 (e.g., PDGCM 410) may collect data of multiple IMS SIP sessions initiated by originating user device 120. Session data may include, for example, the source address of the caller (e.g., originating user device 120), the destination addresses (e.g., terminating user devices 125) for each call, the network type associated with the destination address (e.g., wireline network 105, wireless network 115), the time of calls, the duration of calls, etc.

SIP data from network elements may be collected (block 620). For example, IMS SIP optimization server 210 (e.g., AIM 460) may identify appropriate SIP session commands for each of the network elements (e.g., network elements 215) within the IMS network (e.g., IMS network 115). Thus, for example, IMS SIP optimization server 210 may identify one set of commands to establish a SIP session for network element 215-1 (which may be a P-CSCF) and a different set of commands to establish a SIP session for network element 215-2 (which may be a SIP AS).

Call patterns may be determined (block 630). For example, IMS SIP optimization server 210 (e.g., PDGCM 410 and/or SSPAMM 420) may analyze the session collected data to construct and manage categories and sub-categories. Categories for a single originating device may differentiate between, for example, call sessions to terminating devices using a wireline network and call sessions to terminating devices using a wireless network. Call sessions to terminating devices using a wireless network may be further grouped by the type of wireless network or network protocol used (e.g., CDMA, GSM, 3G LTE, etc.). IMS SIP optimization server 210 may identify patterns within the categories and/or sub-categories. For example, a particular originating user device 120 may regularly place one IMS call to a particular terminating device 125 on weekdays about noon. IMS SIP optimization server 210 may recognize this calling pattern and prioritize network resources to facilitate the SIP session in advance of the call from the particular originating user device 120.

Pattern accuracy may be analyzed (block 640). For example, IMS SIP optimization server 210 (e.g., ASCM 430) may apply control theory methods to gauge the accuracy of previously identified patterns. Thus, IMS SIP optimization server 210 may account for random deviations from the identified patterns.

A SIP session may be initiated with a last network element (block 650). For example, IMS SIP optimization server 210 (e.g., SSAMM 440), in response to a SIP session invite message, may identify the last network element (e.g., network element 215-n) in the SIP session setup process for the particular SIP session invite message. The last network element 215-n may be the network element nearest to the terminating device that is required to set up the requested SIP session. IMS SIP optimization server 210 may bypass intermediate network elements 215 and provide a SIP session invite message to the last network element 215-n that has the appearance of a having been processed sequentially through all network elements SIP setup process.

Customized SIP messages to other network elements may be initiated (block 660). For example, IMS SIP optimization server 210 (e.g., SSAMM 440) may provide an IDP to each intermediate network element 215 to update each intermediate network element of the SIP session status for originating user device 120 and terminating user device 125. In one implementation, the customized SIP messages may be provided in parallel with the SIP session invite message sent to the respective last network element 215-n.

SIP session data may be updated (block 670). For example, IMS SIP optimization server 210 (e.g., CRNM 450) may identify whether the optimized SIP session setup was successful or unsuccessful. CRNM 450 may then provide the session data to one or more other modules within IMS SIP optimization server 210 to further improve, for example, pattern definitions and the library of SIP commands and messages.

While process 600 has been described primarily in the context of SIP session setups, process 600 may be applied similarly for SIP session teardown commands (e.g., cancel or bye SIP requests). Thus, IMS SIP optimization server 210 may provide reduced message traffic and transaction time for both IMS SIP setups and teardowns.

Figure 7:
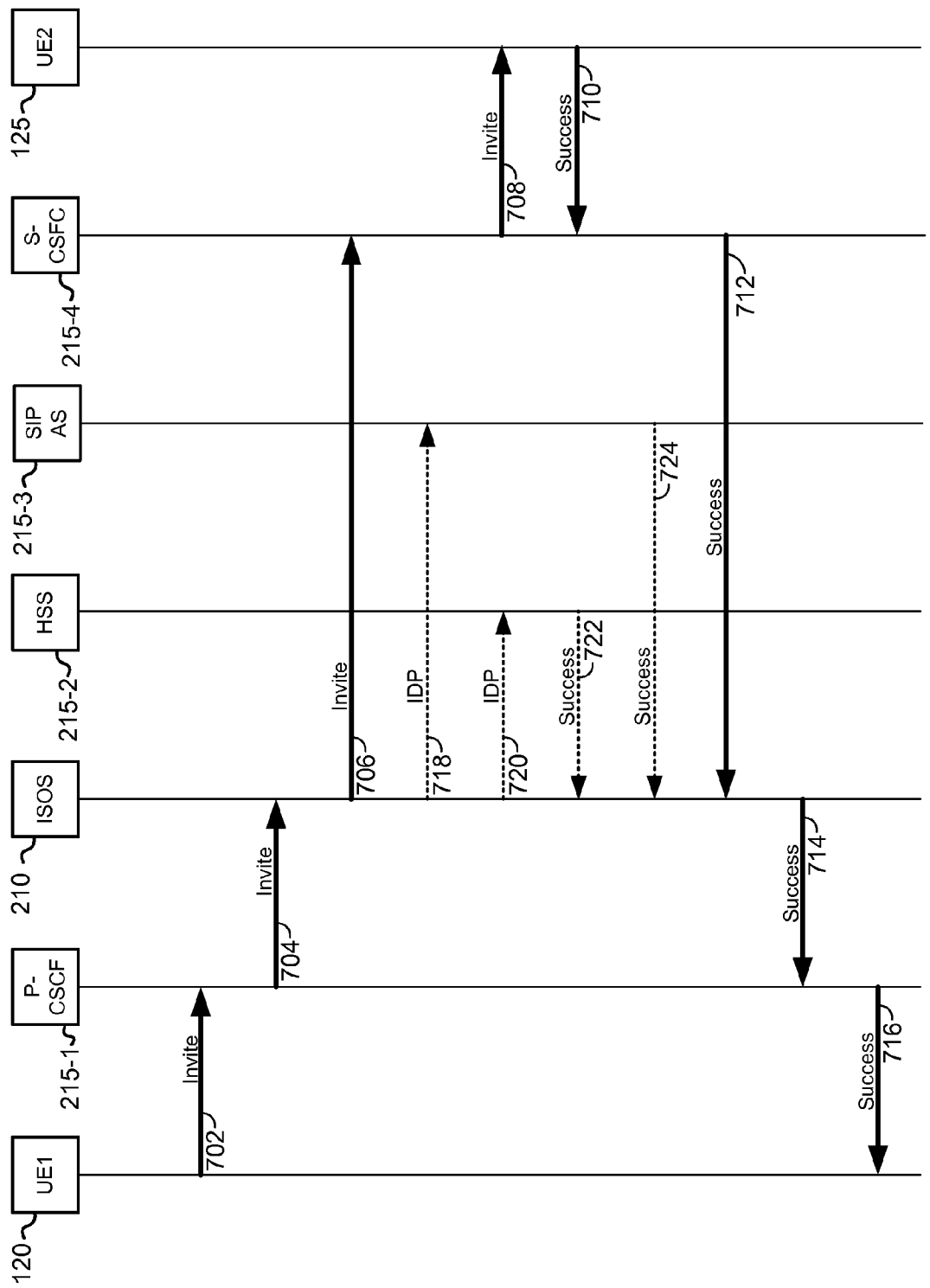
FIG. 7 is diagram illustrating an exemplary SIP call flow associated with the exemplary process of FIG. 6.

FIG. 7 provides a simplified call flow for an exemplary SIP setup session according to implementations described herein. As shown in FIG. 7, an originating user device 120 (e.g., UE1) may initiate a SIP session by sending SIP invite message 702 to a first network element 215-1 (e.g., P-CSCF). The first network element may, in turn, provide SIP invite message 704 to IMS SIP optimization server (ISOP) 210. IMS SIP optimization server 210 may direct SIP invite message 706 directly to the last network element 215-4 (e.g., S-CSCF 215-4) in the SIP setup sequence for the requested SIP session, bypassing intermediate network elements 215-2 (e.g., HSS) and 215-3 (SIP AS). The last network element 215-4 may send SIP invite message 708 to a terminating user device 125 (e.g., UE2).

Assuming the SIP invite message was successfully received, understood, and accepted, terminating user device 125 may respond to the SIP invite message with success message 710 for the last network element 215-4. The last network element 215-4 may, in turn, provide success message 712 to IMS SIP optimization server 210, again bypassing intermediate network elements 215-3 and 215-2. IMS SIP optimization server 210 may provide success message 714 to the first network element 215-1, and the first network element 215-1 may then provide success message 716 to the originating user device 120 to complete the SIP session setup.

Intermediate network elements 215-2 and 215-3 may be updated to support the SIP session setup by receiving customized packet messages. Thus, IMS SIP optimization server 210, in parallel with SIP invite message 706, may send IDP 718 to intermediate network element 215-3 and IDP 720 to intermediate network element 215-2. Assuming the IDP was successfully received, understood, and accepted, each of intermediate network elements 215-2 and 215-3 may respond to IMS SIP optimization server 210 with success message 722 and 724, respectively. While two intermediate network elements 215-2 and 215-3 are shown in the simplified example of FIG. 7, in other implementations, more or fewer intermediate network elements 215 may be included.

Systems and/or methods described herein may include an IMS SIP optimization server in communication with multiple network elements within an IMS network. The IMS SIP optimization server may facilitate an end-to-end SIP session between an originating user device and a terminating user device, while sending SIP session information to intermediate network elements in parallel. The IMS SIP optimization server may collect history SIP session data for the originating devices, terminating devices and network elements to predict SIP session activity and enable the use of parallel setup messages to the intermediate network elements. The IMS SIP optimization server may receive a SIP request from a first network element, where the first network element is a nearest network element in a SIP sequence to the originating user device, and send a related SIP request to a last network element, where the last network element is a nearest network element in the SIP sequence to the terminating user device. The IMS SIP optimization server may also send customized packet messages to any intermediate network elements, where the intermediate network elements are between the first network element and the last network element in the SIP sequence, and where the customized packet message includes SIP setup commands for each of the intermediate network elements.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with respect to FIG. 6, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device, comprising:
 a Session Initiation Protocol (SIP) session activation manager module in communication with a plurality of network elements within a network, the SIP session activation manager module facilitating an end-to-end SIP session between an originating user device and a terminating user device and is to:
  receive a SIP request from a first network element of the plurality of network elements, the first network element being a nearest network element in a SIP sequence to the originating user device,
  send a related SIP request to a last network element of the plurality of network elements, the last network element being a nearest network element in the SIP sequence to the terminating user device and the related SIP request bypasses an intermediate network element of the plurality of network elements, the bypassed intermediate network element being in a first state,
  send a customized packet message to the bypassed intermediate network element being in the first state,
   the customized packet message being different than the related SIP request,
   the intermediate network element being between the first network element and the last network element in the SIP sequence, and
   the customized packet message includes including SIP setup commands for the intermediate network element; and
  receive, from the last network element, a message indicating that the related SIP request was successfully received by the terminating user device.

2. The device of claim 1, further comprising:
 a pattern data gathering and categorization module to collect SIP call flow data for a plurality of SIP sessions within the network.

3. The device of claim 2, further comprising:
 a SIP sessions pattern analysis manager module to identify a session pattern based on the SIP call flow data, where the SIP session activation manager module prioritizes the end-to-end SIP session based on the session pattern.

4. The device of claim 3, further comprising:
 an adaptive controller module to assess the accuracy of the session pattern.

5. The device of claim 1, further comprising:
 a client record network module to determine ratios of successful SIP sessions for the originating device or one of the plurality of network elements.

6. The device of claim 1, further comprising:
 an adaptive interface module to identify SIP setup or teardown command messages for each of the plurality of network elements.

7. The device of claim 1, where the network comprises an Internet Protocol (IP) Multimedia Subsystem (IMS) network.

8. A computer-implemented method, comprising:
 receiving, by a processor of the computer, a Session Initiation Protocol (SIP) request from a first network element of a plurality of network elements, the first network element being a nearest network element in a SIP sequence to an originating user device,
 sending, by the processor, a related SIP request to a last network element of the plurality of network elements, the last network element being a nearest network element in the SIP sequence to a terminating user device and the related SIP request bypasses an intermediate network element of the plurality of network elements, the bypassed intermediate network element being in a first state,
 sending, by the processor, a customized packet message to the bypassed intermediate network element being in the first state, the customized packet message being different than the SIP request, the intermediate network element being between the first network element and the last network element in the SIP sequence, the customized packet message including SIP setup commands for the intermediate network element, and the SIP request, the related SIP request, and the customized packet message together initiating an end-to-end SIP session between the originating user device and the terminating user device; and receiving, from the last network element, a message indicating that the related SIP request was successfully received by the terminating user device.

9. The computer-implemented method of claim 8, where the sending the customized packet message to the intermediate network element is performed in parallel with the sending the related SIP request to the last network element.

10. The computer-implemented method of claim 8, further comprising:
collecting SIP call flow data for a plurality of SIP sessions within an the network.

11. The computer-implemented method of claim 10, identifying a session pattern based on the SIP call flow data, where the SIP session activation manager module prioritizes the end-to-end SIP session based on the session pattern.

12. The method of claim 11, further comprising:
assessing the accuracy of the session pattern based on at least one stochastic control methodology.

13. The method of claim 8, further comprising:
comparing a number of successful SIP sessions against a number of total sessions for the originating device or one of the plurality of network elements.

14. The method of claim 8, further comprising:
identifying particular SIP setup or teardown command messages for each of the plurality of network elements.

15. The method of claim 8, where the network comprises an Internet Protocol (IP) Multimedia Subsystem (IMS) network.

16. A device, comprising:
a memory to store a plurality of instructions to establish a Session Initiation Protocol (SIP) session; and
a processor to execute instructions in the memory to:
receive a SIP request, over a network, from a first network element, the first network element being a nearest network element in a SIP sequence to an originating user device,
send, over the network, a related SIP request to a last network element, the last network element being a nearest network element in the SIP sequence to a terminating user device and the related SIP request bypasses at least one intermediate network element, the at least one bypassed intermediate network element being in a first state,
send, over the network, one or more customized packet messages to the at least one bypassed intermediate network element being in the first state,
the one or more customized packet messages being different than the related SIP request,
the at least one intermediate network element being between the first network element and the last network element in the SIP sequence,
each of the one or more customized packet messages includes including SIP commands for a particular one of the at least one intermediate network element, and
the SIP request, the related SIP request, and the one or more customized packet messages together initiating an end-to-end SIP session between the originating user device and the terminating user device; and
receive, from the last network element, a message indicating that the related SIP request was successfully received by the terminating user device.

17. The device of claim 16, where the processor is further to:
collect SIP call flow data for a plurality of SIP sessions within the network, identify a plurality of session patterns based on the SIP call flow data, and prioritize the end-to-end SIP session based on the session pattern.

18. The device of claim 16, where the processor is further to:
identify SIP setup or teardown command messages for at least one of the network elements.

19. The device of claim 16, where the network comprises an Internet Protocol (IP) Multimedia Subsystem (IMS) network.

20. The device of claim 16, where the processor sends the related SIP request to the last network element and the one or more customized packet messages to the at least one intermediate network element in parallel.

21. A system comprising:
means for receiving a Session Initiation Protocol (SIP) request from a first network element, the first network element being a nearest network element in a SIP sequence to an originating user device,
means for sending a related SIP request to a last network element, the last network element being a nearest network element in the SIP sequence to a terminating user device and the related SIP request bypasses at least one intermediate network element, the at least one bypassed intermediate network element being in a first state,
means for sending one or more customized packet message to the at least one bypassed intermediate network element being in the first state,
the one or more customized packet messages being different than the related SIP request,
the at least one intermediate network element being between the first network element and the last network element in the SIP sequence,
each of the one or more customized packet messages including SIP commands for a particular one of the at least one intermediate network element, and
the SIP request, the related SIP request, and the one or more customized packet messages together initiating an end-to-end SIP session between the originating user device and the terminating user device; and
means for receiving, from the last network element, a message indicating that the related SIP request was successfully received by the terminating user device.

22. The system of claim 21, where the network comprises an Internet Protocol (IP) Multimedia Subsystem (IMS) network.

* * * * *